Nov. 25, 1952 — O. B. HOWSER — 2,618,917
ROCK PICKER AND LOADER
Filed May 20, 1949 — 2 SHEETS—SHEET 1
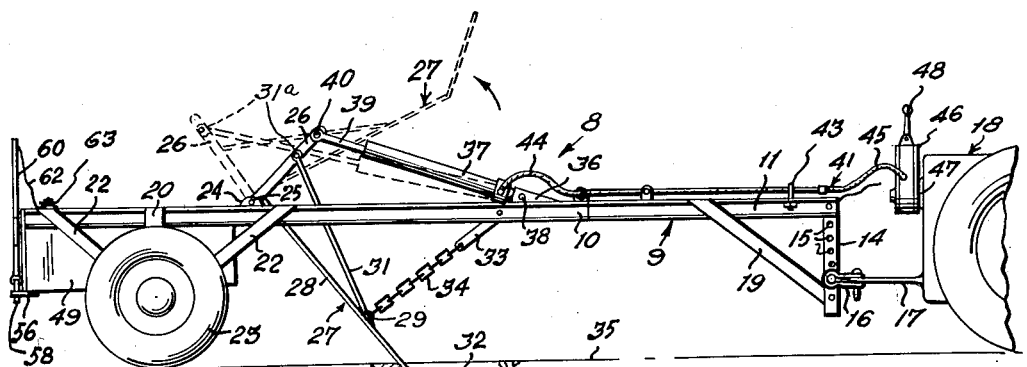
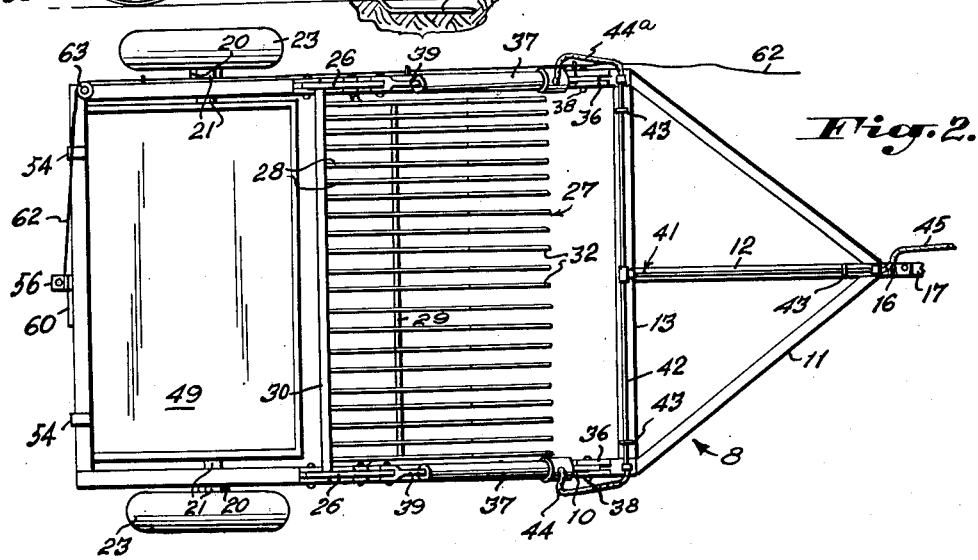
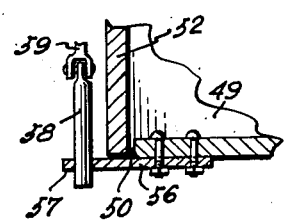
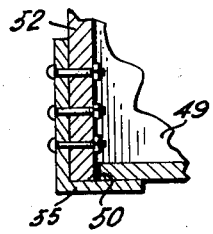
Inventor
Oran B. Howser
By John N. Randolph
Attorney Nov. 25, 1952  O. B. HOWSER  2,618,917
ROCK PICKER AND LOADER
Filed May 20, 1949  2 SHEETS—SHEET 2
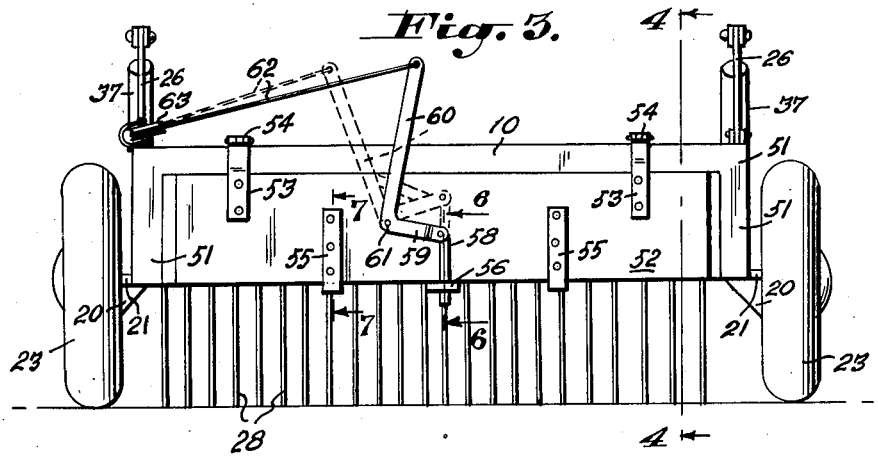
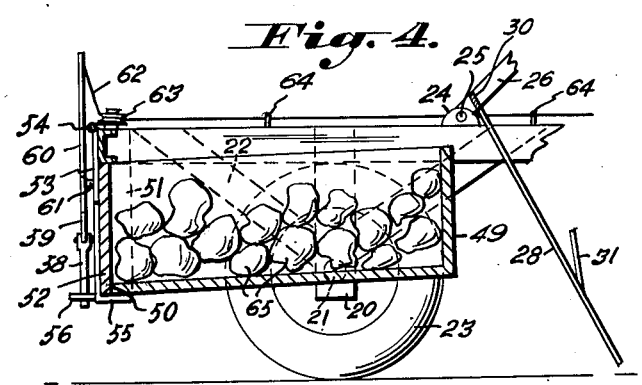
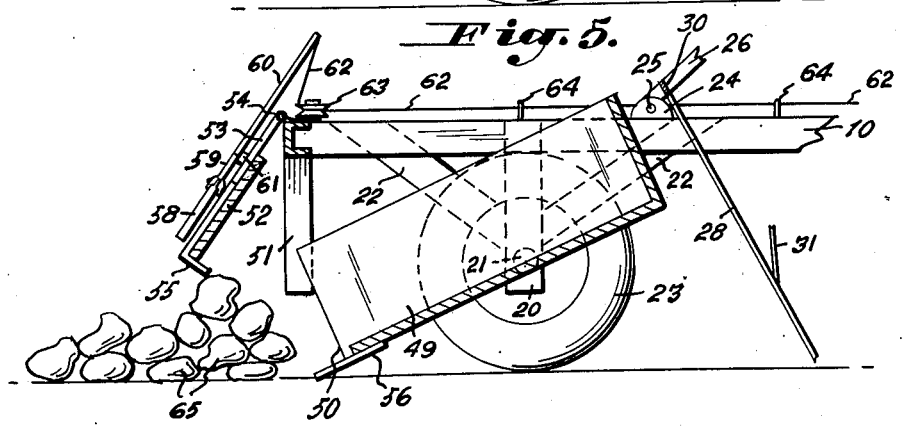
Inventor
Oran B. Howser
By John N. Randolph
Attorney Patented Nov. 25, 1952

2,618,917

UNITED STATES PATENT OFFICE 2,618,917

ROCK PICKER AND LOADER

Oran B. Howser, Lakota, N. Dak.

Application May 20, 1949, Serial No. 94,318

3 Claims. (Cl. 55—17)

This invention relates to a novel implement adapted to be attached to a draft vehicle and drawn thereby for picking up rocks, stones and other foreign objects and for intermittently depositing said objects in a receptacle of the implement to be subsequently unloaded at a desired location.

More particularly, it is an aim of the present invention to provide a wheeled trailer implement capable of being attached to a tractor or other draft vehicle equipped with a hydraulic pump and including a gathering member which is adapted to be hydraulically raised for unloading rocks, stones and foreign objects gathered thereby into a container, carried by the implement.

Still another object of the invention is to provide an implement having a novel construction of container means and associated latch means capable of being actuated from the draft vehicle for releasing and unloading the contents of the container or receptacle, where desired.

Still a further object of the invention is to provide a hydraulically actuated gatherer including a plurality of laterally spaced tines having free end portions disposed to normally travel slightly below the ground level and including other portions disposed at an angle thereto and forming a chute, when the gatherer is hydraulically actuated for discharging the objects gathered thereby into the implement receptacle.

Various other objects and advantages of the invention will hereinafter become more fully apparent from the following description of the drawings, illustrating a presently preferred embodiment of the device, and wherein:

Figure 1 is a side elevational view thereof shown coupled to the rear end of a draft vehicle;

Figure 2 is a top plan view of the implement;

Figure 3 is an enlarged rear elevational view thereof;

Figure 4 is a longitudinal sectional view taken substantially along a plane as indicated by the line 4—4 of Figure 3;

Figure 5 is a sectional view similar to Figure 4 but showing the container parts in an unlatched, unloading position; and Figures 6 and 7 are enlarged fragmentary vertical sectional views taken substantially along planes as indicated by the lines 6—6 and 7—7, respectively, of Figure 3.

Referring more specifically to the drawings, the rock gathering and unloading implement or device in its entirety is designated generally 8 and includes a frame, designated generally 9 having a substantially rectangular rear portion 10 and a forwardly converging front end portion 11 which preferably includes a longitudinal brace 12 which extends between the forward end of the portion 11 and the transverse forward portion 13 of the open rectangular rear frame portion 10. The forward end of the front frame portion 11 is provided with a depending draft bar 14 having spaced openings 15 for selectively receiving a coupling unit 16 by means of which the implement 8 may be detachably coupled to a rearwardly extending draw bar 17 of a draft vehicle, such as a tractor, the rear portion of which is illustrated in Figure 1 and designated generally 18. The draft bar 14 is preferably braced by one or more diagonal braces 19 which extend between the lower end thereof and upwardly and rearwardly to the frame 9.

A pair of hangers 20 are each fastened to a longitudinal side of the frame portion 10, near the rear end thereof and depend downwardly therefrom in laterally aligned relationship to provide a support for stub axles 21, one of which extends through and is supported on each of the hangers 20. The hangers 20 are braced relatively to the frame portion 10 by pairs of diagonal braces 22. A surface engaging supporting wheel 23 is journaled on the outer end of each stub axle 21 and said wheels 23 provide the wheeled support for the rear end portion of the frame 9.

The side members of the frame portion 10, forwardly of and adjacent the wheels 23 are each provided with an upstanding bearing 24 for journaling a shaft 25. A lever 26 projects upwardly from each shaft 25 and is fixed thereto. A rake, designated generally 27 comprises a plurality of corresponding laterally spaced tines 28 which are connected intermediate of their ends by a cross bar 29 and at their rear ends by a cross bar 30. The rear cross bar 30 is secured at its ends rigidly to the levers 26, adjacent the inner ends thereof which are fixed to the shafts 25. A rigid brace 31 is fastened to each end of the cross bar 29 and said braces 31 are disposed at an angle to the rake tines 28 and are each connected at its opposite end at 31a to the intermediate portion of the lever 26 which is located at the same side of the frame portion 10. The forward, free ends of the tines 28 are bent at an oblique angle to the rear portions thereof to form the forwardly projecting free end portions or terminals 32.

A link 33 is pivotally connected to each side member of the frame portion 10 forwardly of the rake or gatherer 27 and a chain 34 is connected at one end to the free end of each link 33. The links 33 and chains 34 extend downwardly and rearwardly and said chains are connected at their opposite ends to the lower, forward ends of the braces 31, as best seen in Figure 1, for limiting the downward and rearward swinging movement of the rake 27 which swings with the levers 26 and shafts 25 relatively to the bearings 24, for supporting the rake 27 in a lowered, operative position, as seen in Figure 1, with the tine portions 32 preferably slightly below the ground level 35.

A bearing 36 is mounted on each side member of the frame portion 10 and extends upwardly therefrom, forwardly of and adjacent the links 33. A hydraulic cylinder 37 is pivotally connected at its closed end at 38 to each bearing 36 and said cylinders extend upwardly and rearwardly therefrom with respect to the frame portion 10 and each contains a reciprocating piston, not shown, having a piston rod 39 extending reciprocably through the rear, free end thereof. Each piston rod 39 is pivotally connected at 40 to one of the levers 26, near the free end of the latter.

A conduit system, designated generally 41, includes a substantially T-shaped pipe or conduit 42 which is secured as by means of U-bolt fastenings 43 to the upper side of the frame members 12 and 13. A flexible hose 44 is connected at one end thereof to one cylinder 37 and a hose 44a is connected to the other cylinder 37, adjacent the pivoted, closed ends of the cylinders and the opposite ends of the two hoses 44 and 44a are connected to the ends of the cross member of the pipe 42. The other transverse member of the pipe 42, which extends forwardly along the brace 12, is connected at its forward, free end to one end of a flexible hose 45, the opposite end of which is detachably connected to a conventional pump 46 which constitutes a part of the draft vehicle or tractor 18 and which may be driven by the power take-off 47 thereof. The pump 46 is provided with a control member 48 by means of which a hydraulic medium may be supplied to the conduit system 41 or released therefrom, in a conventional manner.

A box-like receptacle 49, having an open rear end 50, is supported in the rear part of the open rectangular frame portion 10, rearwardly of the rake or gatherer 27, by the inner ends of the stub axles 21 which are rotatably connected to the sides thereof, forwardly of the longitudinal center of the container 49 so that the open rear end 50 will normally swing downwardly to an unloading position, as illustrated in Figure 5. The rear corners of the frame portion 10 are provided with depending bars 51 forming guides for the container 49 and between which the open rear end thereof is swingably disposed. An end gate or closure 52 is provided with upwardly extending strap hinges 53 which are fastened to the outer sides thereof and hinged at 54 to the upper edge of the rear cross member of the frame portion 10 for mounting said closure or tail gate 52 for swinging movement downwardly and forwardly or upwardly and rearwardly with respect to the frame portion 10. The tail gate or closure 52 is provided on its outer side with strap members 55 each having a free end which is bent to extend forwardly from the bottom edge of the closure 52 for engaging under the rear portion of the container bottom, as best seen in Figure 4, when said closure 52 is in a position for supporting the open rear end of the container 49 in a raised position and closed by the tail gate 52. A keeper bar 56 is secured to the underside of the bottom of the container 49 and extends from the rear end thereof and has an aperture 57, adjacent its free end, for releasably receiving a depending latch pin 58 which is pivotally connected at its upper end to the free end of the shorter leg 59 of a bell crank 60 which is pivotally mounted at its apex at 61 on the outer side of the tail gate or closure 52. One end of a flexible member 62 is connected to the upper end of the longer leg of the bell crank 60 and extends laterally therefrom around a guide pulley 63 which is mounted on one rear corner of the frame portion 10 and thence longitudinally along one side of the frame 9 through guide eyes 64. The free end of the flexible member 62 is adapted to be disposed conveniently accessible to the operator of the draft vehicle 18.

Assuming that the rake or gatherer 27 is in its normal operative position of Figure 1 and that the container 49 is in a raised and closed position, as seen in Figures 1, 3 and 4, the implement 9 is drawn behind the draft vehicle 18 with the tine portions 32 disposed slightly below the level of the earth so that rocks, stones and other foreign matter will be gathered by the tine portions 32 and deflected against the upwardly and rearwardly extending portions of the tines, by which such objects will be conveyed until the lower portion of the rake or gatherer 27 is substantially loaded. The operator of the draft vehicle 18 by operating the control member 48 may then supply hydraulic pressure to the cylinders 37 to cause the piston rods 39 thereof to be moved rearwardly for exerting a rear thrust on the levers 26 which will cause said levers and the shaft 25 to turn rearwardly or counter-clockwise as seen in Figure 1 for swinging the rake or gatherer 27 upwardly from its full line to its dotted line position of Figure 1, in which latter position, the objects which have been gathered by the rake tines will roll or slide by gravity back over the rear end portions of said tines, which are inclined downwardly and rearwardly, as seen in Figure 1, for discharge therefrom into the open top of the container 49. The forward motion of the draft vehicle 18 and trailer implement 9 preferably ceases before the rocks and other objects are thus discharged from the rake 27 into the container 49, and before resuming the forward motion, the control member 48 is moved to a position for releasing the pressure of the hydraulic medium in the cylinders 37 so that the weight of the rake 27 will return it to its full line, operative position of Figure 1, so that the operation just previously described can be repeated.

When the container 49 has been substantially filled with rocks or other foreign objects 65, the implement 9 is moved by the draft vehicle 18 to a location where it is desired to dump or unload the objects 65 and the operator by then pulling on the flexible member 62 will cause the bell crank 60 to be swung counterclockwise as seen in Figure 3 for lifting and disengaging the latch pin 58 from the keeper 56. Since the bell crank 60 is disposed behind the pulley 63, after the latch pin is disengaged and the upper end of the bell crank has swung to or beyond its dotted line position of Figure 3, a further pull exerted thereon in the same direction by the flexible member 62 will tend to pull the tail gate or closure 52 rearwardly for disengaging the strap members 55 from beneath the container bottom. After the strap members 55 are disengaged from beneath the container bottom in this manner or by manually swinging the closure 52 upwardly and rearwardly, the weight of the objects 65 will then cause the container 49 to swing downwardly at its rear open end 50, due to the forward location of its pivotal mounting, so that the objects 65 will slide out of the open rear end 50 as the implement 9 is drawn forwardly or from left to right of Figures 1, 2, 4 and 5. The rear end of the container 49 may then be manually elevated and the tail gate 52 returned to its position of Figure 4, for supporting the container 49 in a raised position and with its open end 50 closed by the tail gate 52, after which said tail gate may be latched in a closed position by the pin 58. The operation, previously described including the gathering and unloading, may then be repeated.

Various modifications and changes are contemplated and may obviously be resorted to, without departing from the spirit or scope of the invention as hereinafter defined by the appended claims.

I claim as my invention:

1. In a machine of the character described, in combination with a mobile frame, an open top container supported in said frame for receiving objects to be conveyed by the machine, said container having a forward end and a rear end and being pivotally supported in the frame and transversely thereof, the axis of the pivot of said container being disposed parallel to and nearer the forward end than the rear end of the container whereby the rear end of the container will normally swing downwardly, said rear end of the container being open for unloading the contents thereof when the container is inclined downwardly and rearwardly, a closure pivotally connected at its upper end to the frame for swinging movement in a vertical plane, said closure closing the open rear end of the container when the container is in a horizontal position, a supporting member secured to and extending forwardly from the bottom edge of the closure and engaging under the rear end of the container to support the container in a horizontal position, a keeper fixed to the container and projecting rearwardly from beneath the open rear end thereof, and a latch connected to the closure and slidably moveable into and out of engagement with the keeper, said latch retaining the supporting member in a position to support the container and the closure in a position to close the rear end thereof when the latch is in engagement with said keeper.

2. A rock gathering machine as in claim 1, a bell crank pivotally mounted at its apex on said closure, said latch being pivotally connected at one end to one end of said bell crank, and a flexible member having one end connected to the opposite end of the bell crank for elevating the first mentioned bell crank end to disengage the latch from the keeper when a pull is exerted on the opposite end of said flexible member at a point remote to the bell crank.

3. A rock gathering machine as in claim 1, a bell crank pivotally mounted at its apex on said closure, said latch being pivotally connected at one end to one end of said bell crank, and a flexible member having one end connected to the opposite end of the bell crank for elevating the first mentioned bell crank end to disengage the latch from the keeper when a pull is exerted on the opposite end of said flexible member at a point remote to the bell crank, said last mentioned end of the bell crank extending to above the upper end of the closure whereby rocking movement of the bell crank by a pull on the flexible member after disengaging the latch from the keeper will swing the closure outwardly of the container to disengage the supporting member from the container whereby the open end of the container will be swung downwardly by gravity to a dumping position.

ORAN B. HOWSER.

REFERENCES CITED

The following references are of record in the file of this patent:

UNITED STATES PATENTS

| Number | Name | Date |
| --- | --- | --- |
| 138,395 | Gunnuldson | Apr. 29, 1873 |
| 1,563,340 | Christenson | Dec. 1, 1925 |
| 1,625,560 | Morris | Apr. 19, 1927 |
| 2,296,085 | Boldt | Sept. 15, 1942 |
| 2,491,079 | Bestland | Dec. 13, 1949 |
| 2,519,136 | Jochim | Aug. 15, 1950 |